(12) United States Patent
Park

(10) Patent No.: US 7,734,153 B1
(45) Date of Patent: Jun. 8, 2010

(54) VIDEO STREAM PROCESSING METHOD FOR TIME-DELAYED VIEWING

(75) Inventor: Chong-Mok Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2846 days.

(21) Appl. No.: 09/679,069

(22) Filed: Oct. 5, 2000

(30) Foreign Application Priority Data
Oct. 8, 1999 (KR) ............................... 1999-43407

(51) Int. Cl.
H04N 5/00 (2006.01)
(52) U.S. Cl. .......................... 386/124; 386/45; 386/46; 386/125; 386/126
(58) Field of Classification Search ......... 386/124–126, 386/68, 111, 46, 80, 95, 96, 1, 33, 45, 112, 386/94; 348/1, 3, 6–7
See application file for complete search history.

(56) References Cited

U.S. PATENT DOCUMENTS

| 5,317,739 | A | * | 5/1994 | Elko et al. | .................. | 709/216 |
|---|---|---|---|---|---|---|
| 5,371,551 | A | | 12/1994 | Logan et al. | | |
| 5,765,200 | A | * | 6/1998 | McIlvain et al. | ............ | 711/170 |
| 5,771,331 | A | * | 6/1998 | Aoki et al. | .................... | 386/68 |
| 5,884,284 | A | * | 3/1999 | Peters et al. | .................. | 705/30 |
| 5,881,041 | A | | 8/1999 | Takenaka | | |
| 6,009,231 | A | * | 12/1999 | Aoki et al. | .................... | 386/68 |
| 6,233,389 | B1 | * | 5/2001 | Barton et al. | ................. | 386/46 |
| 6,633,516 | B2 | * | 10/2003 | Tone et al. | ............... | 369/30.12 |
| 7,068,921 | B1 | * | 6/2006 | Park | ............................ | 386/125 |
| 2003/0007079 | A1 | * | 1/2003 | Sisselman | .............. | 348/231.99 |
| 2005/0244138 | A1 | * | 11/2005 | O'Connor et al. | ............. | 386/94 |

FOREIGN PATENT DOCUMENTS

| CN | 1208891 A | 2/1999 |
|---|---|---|
| JP | 04-095271 | 3/1992 |
| JP | 6-349197 | 12/1994 |
| JP | 8-256305 | 10/1996 |
| JP | 09-270186 | 10/1997 |
| JP | 10-199213 | 7/1998 |
| JP | 11-053235 | 2/1999 |

OTHER PUBLICATIONS

Chinese Office Action dated Oct. 10, 2003, issued for corresponding Chinese Patent Application.
Japanese Office Action dated Mar. 30, 2004, issued for corresponding Japanese Patent Application.
Japanese Office Action dated Nov. 16, 2004, issued for corresponding Japanese Patent Application.
Patent Abstracts of Japan for Japanese Publication 11-53235, published Feb. 26, 1999.

* cited by examiner

Primary Examiner—Jamie J Atala
(74) Attorney, Agent, or Firm—Staas & Halsey LLP

(57) ABSTRACT

A broadcast receiving system which simultaneously supports time-delayed viewing and recording/reproduction. In the broadcast receiving system, blocks are discontinuously arranged in a circular buffer to rapidly implement time-delayed viewing of a channel and recording/reproduction of another channel at the same time. To do so, circular buffer blocks are discontinuously arranged on a disk surface in a time-delayed viewing mode. If the time-delayed viewing mode is performed simultaneously with a recording/reproduction mode, video streams for time-delayed viewing are recorded in free blocks nearest to blocks in which video streams of a channel to be recorded are recorded or from which video streams of a channel to be reproduced are reproduced. Therefore, two or more modes can be performed effectively and simultaneously.

30 Claims, 7 Drawing Sheets

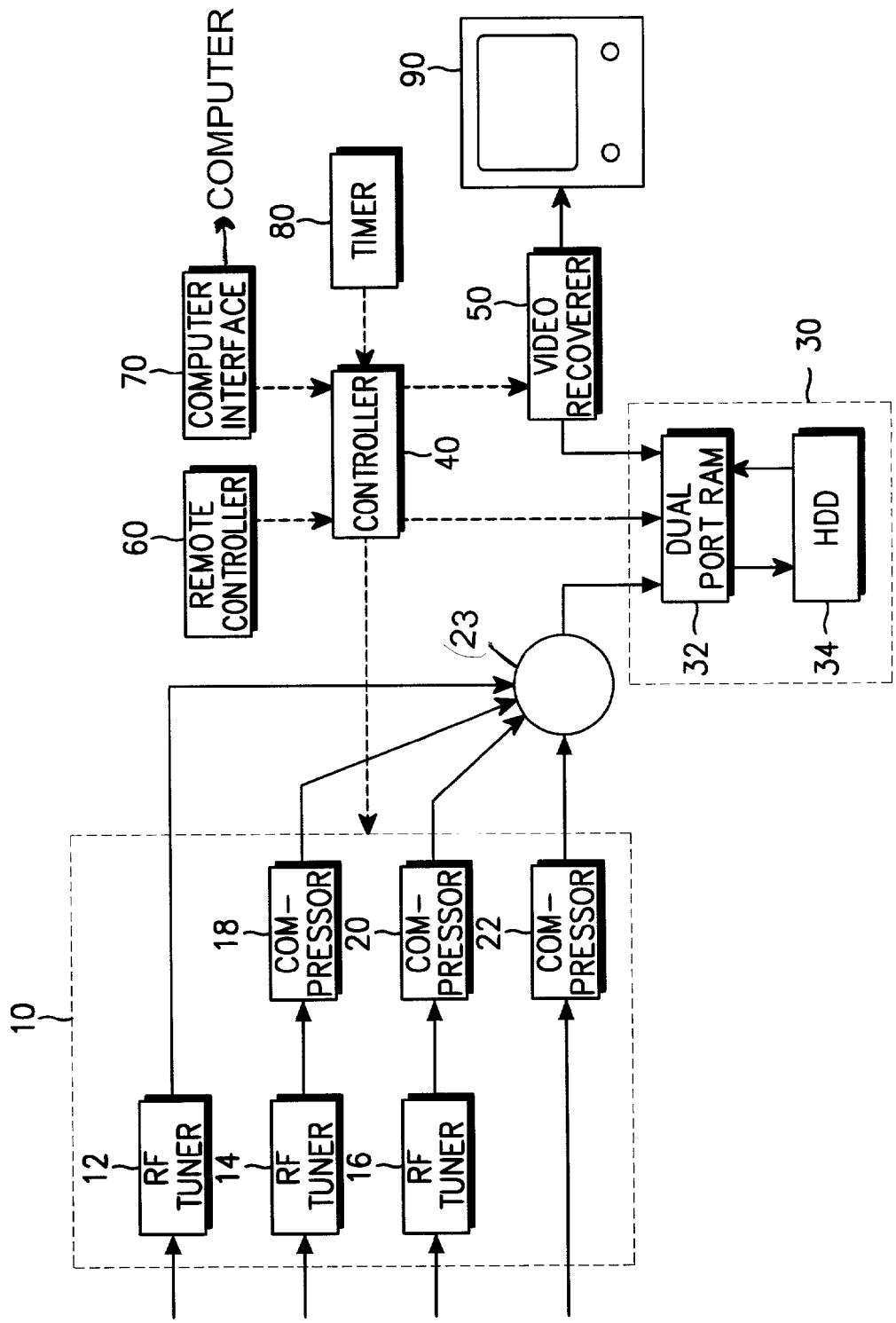

VIDEO STREAM PROCESSING METHOD FOR TIME-DELAYED VIEWING

CROSS-REFERENCE TO RELATED APPLICATIONS

This application claims priority to an application entitled "Video Stream Processing Method for Time-Delayed Viewing" filed in the Korean Industrial Property Office on Oct. 8, 1999 and assigned Serial No. 99-43407, the contents of which are hereby incorporated by reference.

BACKGROUND OF THE INVENTION

1. Field of the Invention

The present invention relates generally to a broadcast receiving system capable of concurrently supporting time-delayed viewing and recording/reproduction of a broadcast signal, and in particular, to a video stream processing method in which a circular buffer, assigned on a recording medium surface for time-delayed viewing, is constituted of discontinuous blocks.

2. Description of the Related Art

Due to its advantages of random access, high data transmission rate, low price, and large capacity as compared to other auxiliary storage devices, a hard disk drive (HDD), which is an auxiliary storage device of a computer system, is used as a random access storage device for a broadcast receiving system.

Such a broadcast receiving system enables simultaneous recording/reproduction with time-delayed viewing of broadcast video streams by controlling buffering of the video streams input/output to/from the HDD.

A description will hereinbelow be given of a method of arranging video streams on a hard disk recording area that is a recording medium in the broadcast receiving system.

FIG. 1 illustrates a method of managing a hard disk as a circular buffer in a broadcast receiving system for time-delayed viewing. FIG. 2 illustrates a method of arranging a plurality of video streams discontinuously in the hard disk recording area.

Referring to FIG. 1, video streams are recorded in blocks of a fixed size when part of the hard disk recording area is managed in the form of a circular buffer. After a write point W and a read point R are designated, new video streams are recorded clockwise or counterclockwise from the write point W and a particular video stream is read by random access at an arbitrary time point in the circular buffer.

When video streams are discontinuously arranged as shown in FIG. 2, the hard disk recording area is divided into blocks of a fixed size and recorded video streams are stored in logical video file units, each logical video file occupying a plurality of blocks. In this case, the blocks of each video file are not always consecutive physically because discontinuous free blocks arise from deletion of video files of different sizes. Information associated with each video file (e.g., title and time) and information about the positions of blocks in the video file are recorded in a separate control information area 36. A video stream storing area 38 has video stream blocks arranged discontinuously. Pluralities of the video stream blocks form video files #1, #2.

The management of the hard disk area in the form of a circular buffer as shown in FIG. 1 incurs access time delay of a head since video streams are successively arranged. Consequently, two separate areas for time-delayed viewing of one channel and recording/reproduction of another channel should be alternately accessed when time-delayed viewing is implemented simultaneously with recording/reproduction.

A broadcast receiving system, if it employs the discontinuous video file arranging scheme shown in FIG. 2, can use the hard disk recording area flexibly and record video streams in files. However, the broadcast receiving system cannot implement continuous recording in a limited area as given in the circular buffer since free blocks are scattered. As a result, a time delay occurs in head movement.

SUMMARY OF THE INVENTION

It is, therefore, an object of the present invention to provide a video stream processing method in which circular buffer blocks are arranged discontinuously in such a way that time-delayed viewing of one channel can be implemented simultaneously with recording/reproduction of another channel.

Additional objects and advantages of the invention will be set forth in part in the description which follows and, in part, will be obvious from the description, or may be learned by practice of the invention.

The time-delayed viewing mode is one in which the user can operate a recording and/or reproducing device so that the broadcast signal is recorded simultaneously within a temporary buffer (a buffer for holding the received content for a limited period of time, e.g., thirty minutes), while viewing prerecorded contents. The temporary buffer can later be retrieved for viewing prerecorded contents using rewind, pause and fast-forward operations. If the time-delayed viewing mode is inactive, no content will be recorded and only real-time viewing is possible.

The recording mode is activated when a user-scheduled event for recording a certain program channel at a certain period of time has met the recording start time. The reproducing mode is activated when a user-scheduled event for reproducing a recorded content (performed in the recording mode) has met the reproducing start time. The reproducing mode is useful for presenting the content to different terminals (TVs) for multi-user viewing or to VCRs for backup purposes. These modes are all independent from the time-delayed viewing, which operates on a temporary basis at a designated terminal. All of the different modes can be carried out simultaneously with different input/output devices, with all of the contents being stored in a shared disk storage system.

To achieve the above and other objects and advantages of the present invention, there is provided a video stream processing method in a broadcast receiving system for time-delayed viewing, which includes a hard disk drive having control information required for recording an input signal and reproducing recorded information recorded in a predetermined area. When a time-delayed viewing mode is selected, free blocks are sequentially assigned as discontinuous circular buffer blocks in a disk recording area and video streams for time-delayed viewing are recorded in the assigned circular buffer blocks, based on the control information. When a recording mode is selected together with the time-delayed viewing mode, free blocks of the disk recording area are assigned, video streams of a channel to be recorded are recorded in the assigned free blocks, free blocks nearest to the recorded free blocks are assigned as circular buffer blocks, and video streams for time-delayed viewing are recorded in the assigned circular buffer blocks. When a reproduction mode is selected together with the time-delayed viewing mode, blocks to be reproduced are read based on the control information, free blocks nearest to the reproduced free blocks are assigned as circular buffer blocks, and video streams for time-delayed viewing are recorded in the assigned circular buffer blocks.

BRIEF DESCRIPTION OF THE DRAWINGS

The above and other objects, features and advantages of the present invention will become more apparent from the following detailed description when taken in conjunction with the accompanying drawings in which:

FIG. 3 is a block diagram of a broadcast receiving system capable of implementing time-delayed viewing simultaneously with recording/reproduction according to an embodiment of the present invention;

DETAILED DESCRIPTION OF THE PREFERRED EMBODIMENT

Figure 1:
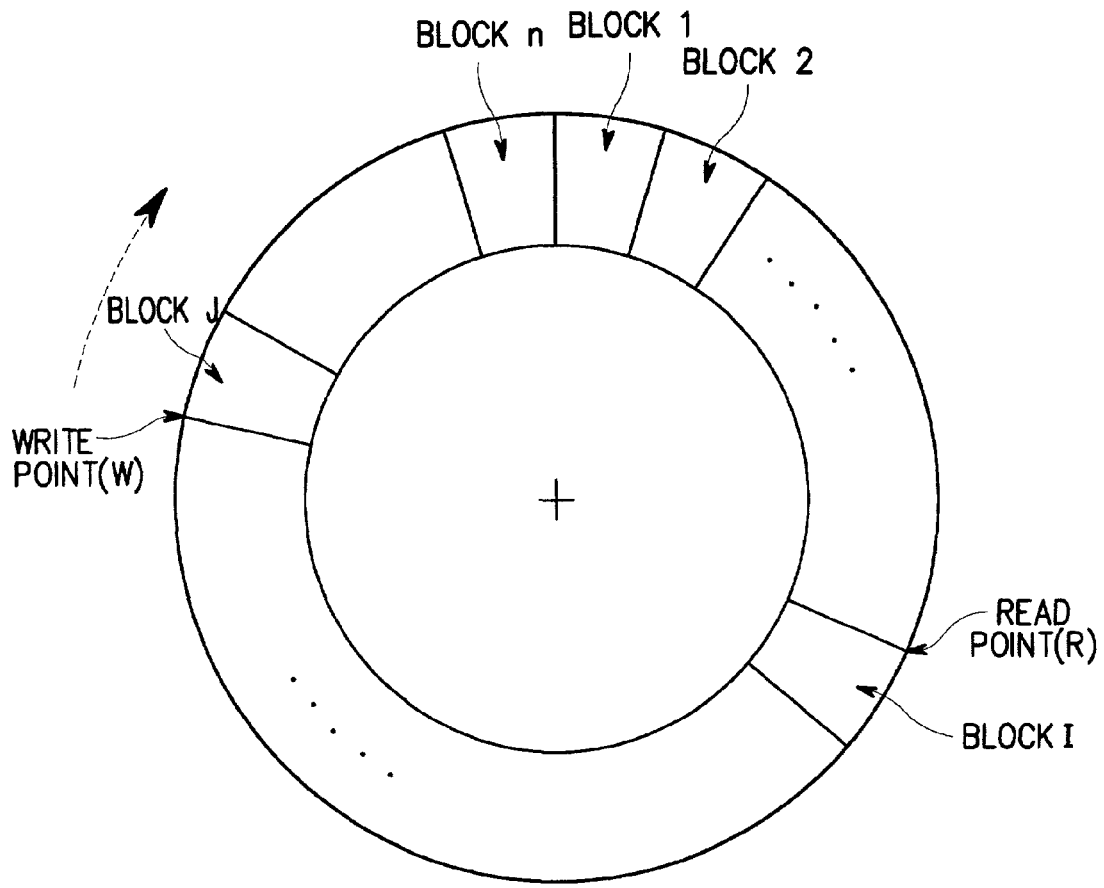
FIG. 1 illustrates a method of managing a hard disk in the form of a circular buffer in a broadcast receiving system for time-delayed viewing.
Figure 2:
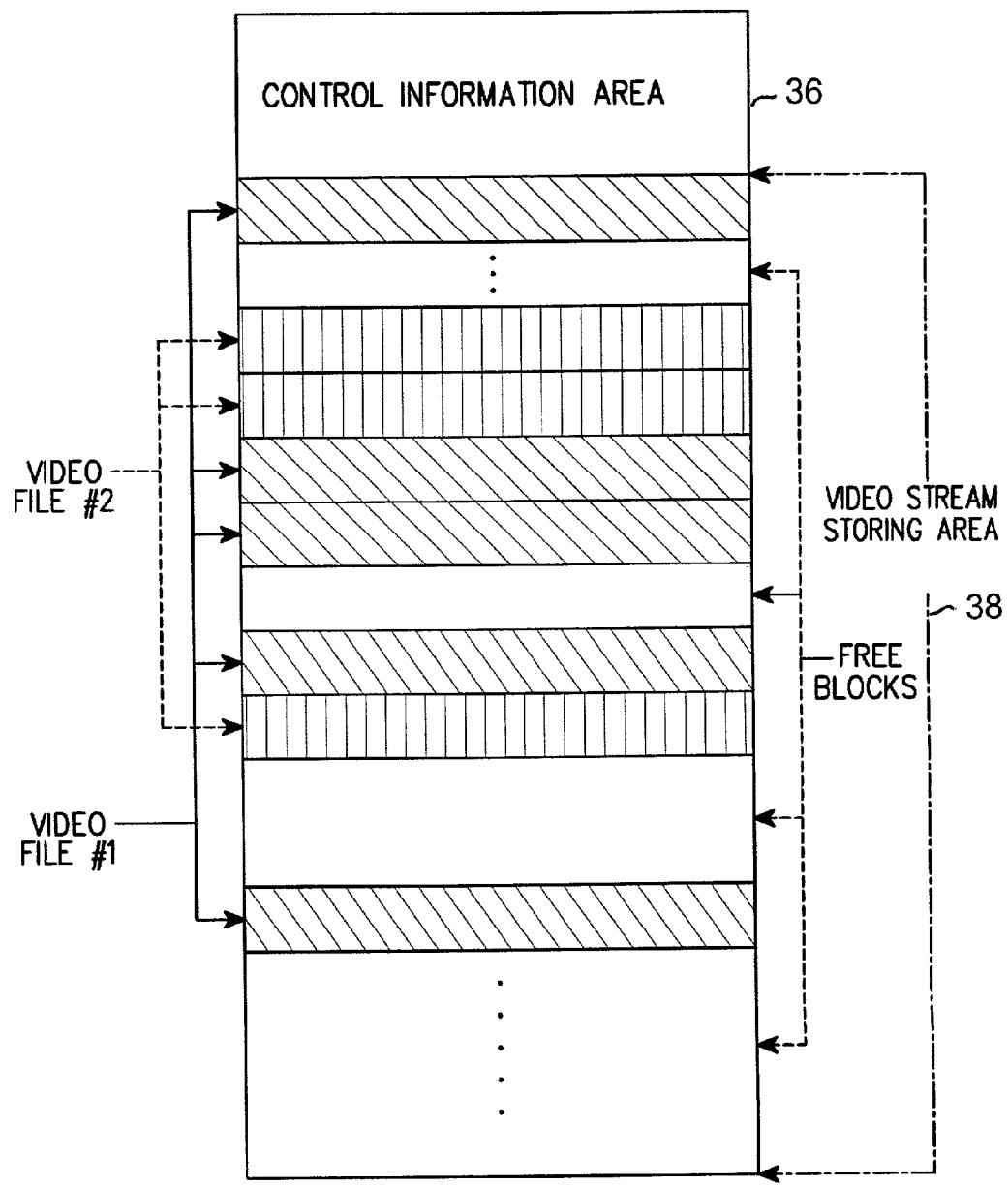
FIG. 2 illustrates a method of arranging a plurality of video streams discontinuously in a hard disk recording area.

A preferred embodiment of the present invention will be described hereinbelow with reference to the accompanying drawings. In the following description, well-known functions or constructions are not described in detail since they would obscure the invention in unnecessary detail.

FIG. 3 is a block diagram of a broadcast receiving system capable of simultaneously implementing time-delayed viewing and recording/reproduction of a broadcast signal according to an embodiment of the present invention. As previously noted, the time-delayed viewing mode, the reproducing mode, the recording mode are all independent from each other, wherein the reproducing mode is useful for presenting the contents to different terminals (TVs) remote-user viewing or to VCRs for backup purposes, or for still other purposes, and the time-delayed viewing mode operates on a temporary basis with a designated terminal. In this broadcast receiving system, all of the operations can be carried out simultaneously at different input/output devices, with all of the contents being stored in a shared disk storage system.

Referring to FIG. 3, a broadcast signal receiver 10 includes a first RF (Radio Frequency) tuner 12 for receiving an external digital broadcast signal, a plurality of second RF tuners 14 and 16 for receiving external analog broadcast signals, and a plurality of video compressors 18 and 20 for converting the analog signals received from the RF tuners 14 and 16 to digital signals and compressing the digital signals. A compressor 22 receives a video baseband signal which is simply compressed. The outputs of the compressors 18, 20 and 22 are supplied to a switching node 23, which provides its output to a dual port RAM 32 of a random access storage device 30.

The random access storage device 30 records a digital video stream received from the broadcast signal receiver 10 in a recording area of a hard disk under the control of a controller 40 and reads the stored video stream. This random access storage device 30 includes an HDD 34 and the dual port RAM 32. The HDD 34 comprises a plurality of hard disks for permanently storing a digital video stream, a controller for controlling the operation of the HDD 34, and an expander (IEEE 1394 interface) for expanding the HDD 34. The dual port RAM 32 includes at least a video stream buffer for temporarily storing a digital video stream.

A video recoverer 50 recovers a video stream received from the random access storage device 30 through a system bus to an original signal and outputs the recovered video stream to a TV receiver 90.

The controller 40 has a ROM for storing control program data to control the random access storage device 30 and the broadcast signal receiver 10 and a RAM for temporarily storing data generated during a control operation.

A remote controller 60, having a plurality of control keys for system control, generates data corresponding to key input and outputs the data to the controller 40. The control keys include "pause", "rewind", "rapid search", and "time-delayed view".

A computer interface 70 interfaces signals between the broadcast receiving system according to the embodiment of the present invention and a computer. A timer 80 generates time information so that the broadcast receiving system can implement automatic recording.

Figure 4B:
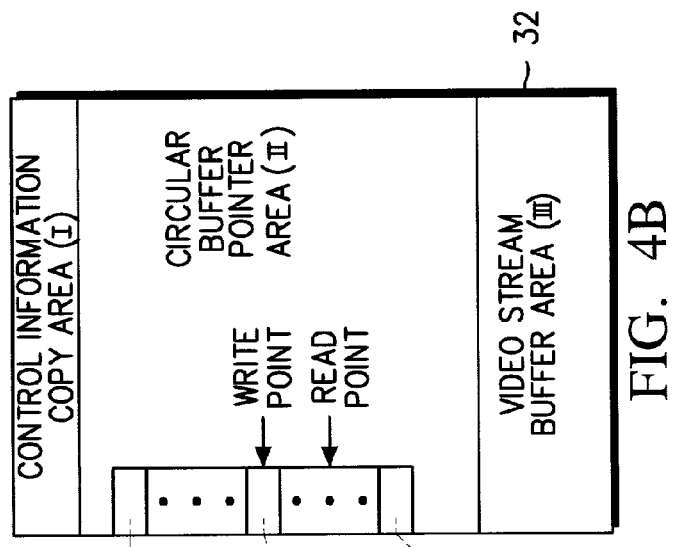
FIGS. 4A and 4B illustrate a layout of discontinuous circular buffer blocks in a hard disk recording area and a layout of recording area segments in a dual port RAM according to the embodiment of the present invention.
Figure 4A:
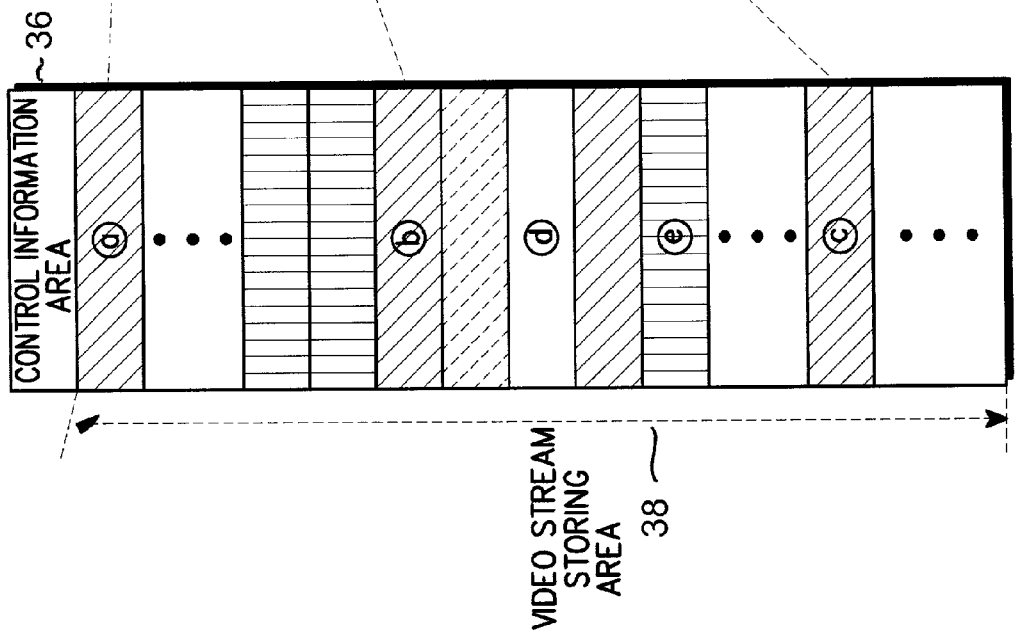
Figure 5:
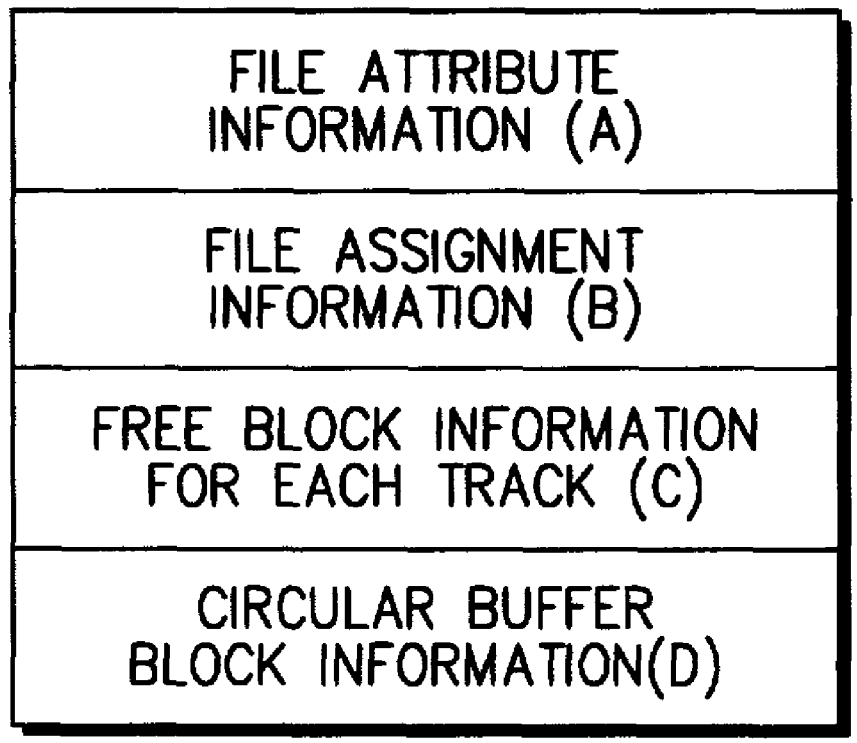
FIG. 5 is an exemplar view illustrating the structure of control information recorded in a control information area shown in FIG. 4.

FIGS. 4A and 4B illustrate a layout of blocks discontinuously arranged in a circular buffer area of a hard disk recording area and a layout of a recording area in the dual port RAM 32. The circular buffer area is formed on the HDD 34, and the storage area of the HDD 34 can be used to serve as a temporary storage buffer operated in a circulating mode. In this embodiment, a non-contiguous storage area is used for such a purpose. FIG. 5 is an exemplary view illustrating the structure of control information recorded in a control information area 36 shown in FIG. 4A.

Referring to the layout indicated in FIG. 4A, the hard disk recording area is divided into the control information area 36 and a video stream storing area 38 in which video stream blocks are arranged discontinuously. In the control information area 36 are recorded file attribute information (A), file assignment information (B), free block information for each track (or each cylinder) (C), and circular buffer block information (D) as shown in FIG. 5. File attribute information (A) provides the title, size, and recording time & date of a recorded video file. File assignment information (B) is information about the positions of blocks of each file on a disk recording area. Free block information (C) for each track is used to manage information about the positions of free blocks in the disk recording area by tracks in order to rapidly assign a free block in a track under recording or reproduction when a recording/reproduction mode is implemented together with a time-delayed viewing mode. Circular buffer block information (D) is used to manage the blocks of a current circular buffer.

The video stream storing area 38 comprises circular buffer areas a, b, and c, free blocks d, and blocks e in which video streams have been recorded in a mode other than a time-delayed viewing mode. The circular buffer areas a, b, and c do not always include successive blocks but may be arranged discontinuously in a disk area in a physical sense, while they are managed continuously in a logical sense. All blocks in the video stream storing area 38 are the same size. One block can include a plurality of consecutive sectors physically and is accessed by one disk operation (read/write) at one time.

Referring to the layout shown in FIG. 4B, the dual port RAM 32 is divided into a control information copy area (I) in which the control information is copied in system initialization, a circular buffer pointer area (II) having a pointer array that points to blocks of a circular buffer, and a video stream buffer area (III) for buffering video stream blocks. Write points and read points of the circular buffer have specific pointer values in the dual port RAM 32 so that the circular buffer areas may include discontinuous blocks.

A method of discontinuously arranging blocks in a circular buffer area will be described with reference to FIGS. 6 and 7.

In the embodiment of the present invention, free blocks are assigned for video streams in a disk recording area of the HDD 34 in an ascending order of tracks/sectors. Generally, tracks concentrically arranged on a disk are numbered from the outer-most circumference to the innermost circumference. After free blocks of the last track are assigned in this manner, the assignment restarts with the first track so that free blocks are assigned in the form of a circle. In case video streams of different channels are recorded concurrently, blocks are assigned interleavedly for each video stream to thereby minimize the movement of a head. Thus, the present broadcast receiving system can simultaneously record video streams of video channels. For analog TV broadcasting, multiple receivers are used, whereas for digital TV broadcasting, a single multiplexed receiver will suffice.

Figure 6:
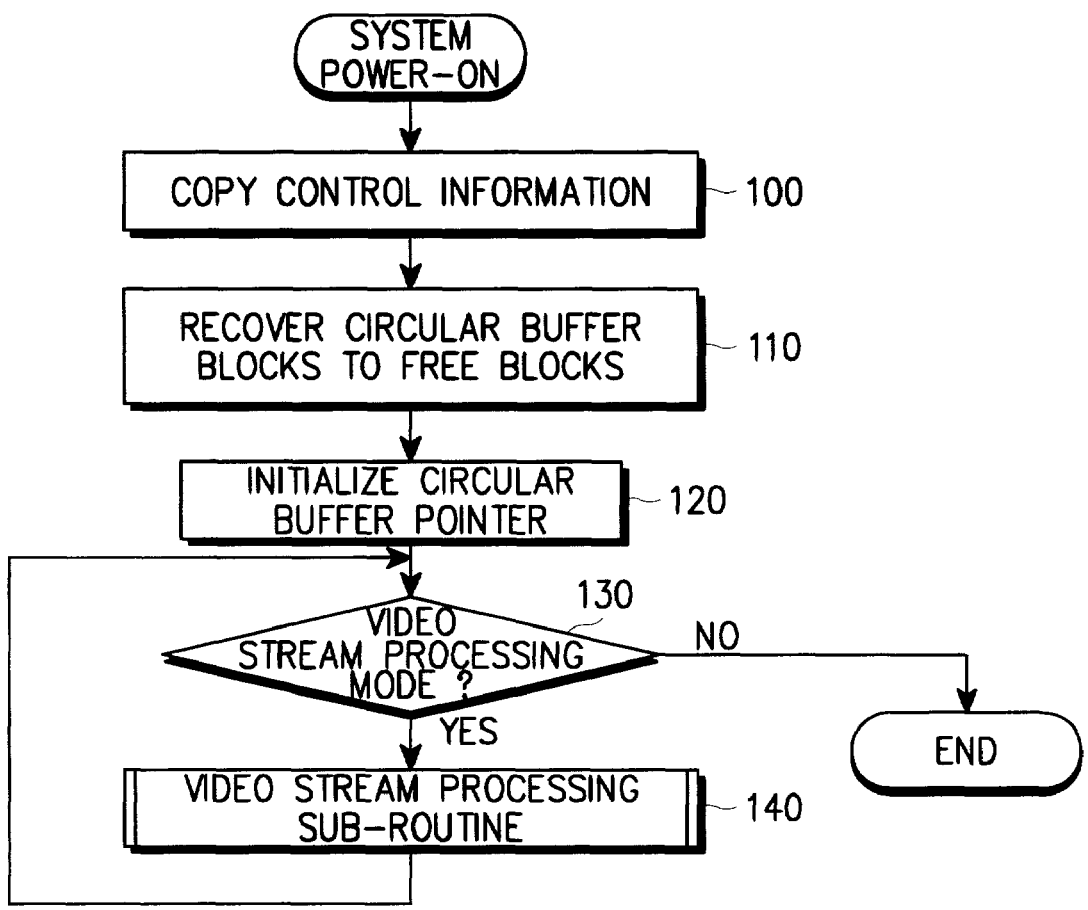
FIG. 6 is a flowchart illustrating an initialization operation of the broadcast receiving system according to the embodiment of the present invention.
Figure 7:
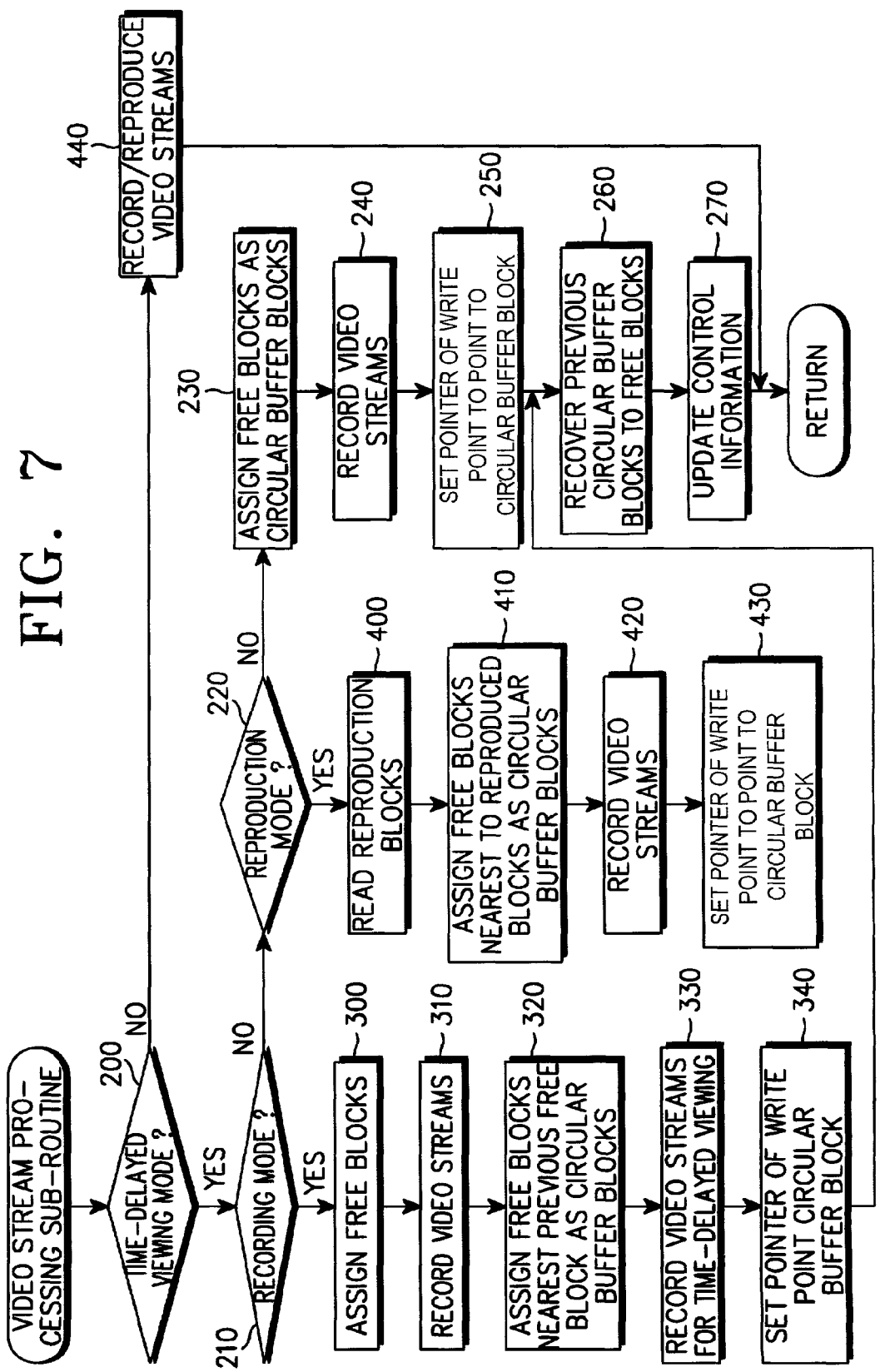
FIG. 7 is a flowchart illustrating a video stream processing method according to the embodiment of the present invention.

FIG. 6 is a flowchart illustrating the initialization operation of the broadcast receiving system according to the embodiment of the present invention and FIG. 7 is a flowchart illustrating a video stream processing sub-routine according to the embodiment of the present invention.

Referring to FIG. 6, in order to initialize the broadcast receiving system upon system power-on, the controller 40 accesses control information recorded in the control information area 36 of the disk recording area and copies it in the control information copy area I of the dual port RAM 32 in step 100, changes circular buffer blocks to free blocks by updating the information of a circular buffer block pointed by a pointer at a write point with free block information in step 110, and initializes a circular buffer pointer in step 120.

Then, the controller 40 is placed in a standby mode and determines whether a video stream processing mode is set in step 130. The video stream processing mode refers to a mode for processing video streams received/transmitted through channels or video streams reproduced from a disk, including a time-delayed viewing mode, a recording mode, a reproduction mode, and a time-delayed viewing & recording/reproduction simultaneous mode. Therefore, if it is determined that a user has input a command to implement one of the modes in step 130, the controller 40 performs a video stream processing sub-routine in the way shown in FIG. 7 in step 140.

The video stream processing sub-routine will be described in detail with reference to FIG. 7. In FIG. 7, steps 230, 240, and 250 are implemented when the user has selected a time-delayed viewing mode only and steps 300 to 340, when the user has selected the time-delayed viewing mode and the recording mode at the same time. Steps 400 to 430 are for the case of selecting the time-delayed viewing mode and the reproduction mode simultaneously, steps 260 and 270 are commonly implemented for all modes, and step 440 is implemented in case the recording or reproduction mode only is selected.

If the controller 40 considers that the current system mode is set to a time-delayed viewing mode in step 200, it determines whether the time-delayed viewing mode is to be implemented together with a recording or reproduction mode in steps 210 and 220 by checking user input of a command for a corresponding mode through the remote controller 60. If only the time-delayed viewing mode has been selected, the controller 40 assigns free blocks as circular buffer blocks referring to the control information in the control information copy area I of the dual port RAM 32 in step 230. The free blocks are assigned in a track/sector number ascending order as stated before. The term "circular buffer block" as used herein is defined as a free block assigned to form a circular buffer and record a video stream for time-delayed viewing therein.

In step 240, the controller 40 records digital video streams received from the broadcasting signal receiver 10 in the assigned circular buffer blocks. The controller 240 sets the pointer of the write point W to point to the last assigned circular buffer block in step 250 and changes the previously assigned circular buffer blocks to free blocks in step 260. The controller 240 updates the control information in the control information copy area I of the dual port RAM 32 and returns to the main loop shown in FIG. 6 in step 270. The updated information includes file attribute information (A), file assignment information (B), and free block information (C) for each block. More precisely, when the circular buffer block is assigned, the control information is updated in the main memory area, but the control information is not updated in the HDD file until requested by other operations which necessitates the same to be synchronized with the HDD 34 (i.e., when recording content within the recording mode). This is because the circular buffer is for temporary use and any block assigned to the circular buffer is free for use when the whole device is initiated (by power off/on). Unless the time-delayed viewing mode is released, the controller 40 repeatedly performs steps 230 to 270 so that video streams for time-delayed viewing are sequentially recorded in discontinuous circular buffer blocks in the hard disk recording area. It is to be noted here that discontinuous assignment of circular buffer blocks does not mean discontinuity of individual circular buffer blocks. In fact, if one track has a plurality of free blocks, all the free blocks may be assigned as circular buffer blocks. Consequently, discontinuous assignment of circular buffer blocks implies that all the circular buffer blocks are not arranged continuously.

Now there will be given a description of simultaneous implementation of time-delayed viewing and (reserved) recording/reproduction.

When a recording mode is selected during the time-delayed viewing mode or both modes are selected at the same time, the controller 40 assigns free blocks based on control information in step 300 and records video streams of a corresponding channel in the assigned free blocks in step 310. In step 320, the controller 40 assigns free blocks nearest to the recorded free blocks as circular buffer blocks. The controller 40 records video streams for time-delayed viewing in the assigned circular buffer blocks in step 330. The "free blocks nearest to the previous free blocks" may be on the same track or in the nearest track. This aims at minimization of track search time by minimizing head movement. If free blocks in an adjacent track are assigned, the track is preferably located in the head moving direction.

The controller 40 sets the pointer of the write point W to point the last assigned circular buffer block in step 340 and changes the previously assigned circular buffer blocks to free blocks in step 260. The controller 40 updates the control information in the control information copy area (I) of the dual port RAM 32 in step 270 and repeatedly performs steps 300 to 340 and steps 260 and 270 to concurrently implement the recording and time-delayed viewing modes until at least one of the time-delayed viewing mode and the recording mode is released. Accordingly, the nearest free blocks to free blocks selected for recording are assigned as circular buffer blocks so that the moving time of the head for track search can be reduced.

When a reproduction mode is selected during the time-delayed viewing mode or both modes are selected at the same time, the controller 40 reads blocks to be reproduced based on control information in step 400 and assigns free blocks nearest to the reproduced free blocks as circular buffer blocks in step 410 to minimize track search time through minimization of head movement. The controller 40 records video streams for time-delayed viewing in the assigned circular buffer blocks in step 420 and sets the pointer of the write point W to point the last assigned circular buffer block in step 430. The controller 40 changes the previously assigned circular buffer blocks to the free blocks in step 260, updates the control information in the control information copy area (I) of the dual port RAM 32 in step 270, and returns to the main loop. Accordingly, the nearest free blocks to the free blocks read for reproduction are assigned as circular buffer blocks so that the moving time of the head for track search can be reduced. Meanwhile, if a command to release the current mode has been received from the user in the video stream processing mode, the controller 40 ends the control operation shown in FIG. 7. If a command to release the time-delayed viewing mode has been received from the user during concurrent implementation of the time-delayed viewing mode and the recording/reproduction mode, the controller records/reproduces video streams in a typical method like step 440.

In accordance with the present invention, head movement can be reduced by assigning circular buffer blocks for time-delayed viewing in a track near to video stream blocks that are being recorded/reproduced when a time-delayed viewing mode is performed simultaneously with a recording/reproduction mode.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A video stream processing method in a broadcast receiving system for time-delayed viewing, which includes disks having control information required for recording an input signal and reproducing recorded information recorded and a drive for driving the disks, the video stream processing method comprising:
    using a processor to assign physically discontinuous free blocks in a disk recording area to sequential logical blocks in a circular buffer, based on the control information when a time-delayed viewing mode is selected; and
    recording video streams for time-delayed viewing in the assigned circular buffer blocks,
    wherein physical blocks are indicated to be free blocks in the control information, and
    wherein the control information comprises file attribute information, file assignment information, free block information for each track, and circular buffer block information.

2. The video stream processing method of claim 1, further comprising updating the control information and setting a pointer of a write point to a last one of the assigned circular buffer blocks after the recording of the video streams.

3. The video stream processing method of claim 1, wherein the sequentially assigning of the free blocks comprises assigning the free blocks as the circular buffer blocks in a track and sector number ascending order.

4. The video stream processing method of claim 1, further comprising:
    recovering the circular buffer blocks to the free blocks when the broadcast receiving system is initialized.

5. The video stream processing method of claim 1, further comprising recovering the assigned circular buffer blocks to the free blocks and updating the control information when a next circular buffer block is assigned.

6. The video stream processing method of claim 1, wherein the sequentially assigning free blocks comprises interleavedly assigning the free blocks for each video stream, if the video streams are of different channels to be recorded concurrently.

7. The video stream processing method of claim 4, wherein the recovering of the circular blocks comprises updating information of one of the circular buffer blocks which is pointed by a pointer at a write point with free block information, the video stream processing method further comprising initializing the pointer.

8. A video stream processing method in a broadcast receiving system for time-delayed viewing, which includes a hard disk drive having control information required for recording an input signal and reproducing recorded information recorded in a predetermined area, the video stream processing method comprising:
    using a processor to assign physically discontinuous free blocks in a disk recording area to sequential logical blocks in a circular buffer and recording video streams for time-delayed viewing in the assigned circular buffer blocks, based on the control information when a time-delayed viewing mode is selected; and
    assigning free blocks of the disk recording area and recording video streams of a channel to be recorded in the assigned physically discontinuous free blocks when a recording mode is selected during the time-delayed viewing mode, assigning free blocks nearest to the recorded free blocks as the circular buffer blocks, and recording the video streams for time-delayed viewing in the assigned circular buffer blocks,
    wherein physical blocks are indicated to be free blocks in the control information, and
    wherein the control information comprises file attribute information, file assignment information, free block information for each track, and circular buffer block information.

9. The video stream processing method of claim 6, further comprising updating the control information and setting a pointer of a write point to a last one of the assigned circular buffer block each time the video streams are recorded in the free blocks subsequent to the recording of the video streams for time-delayed viewing in the assigned circular buffer blocks.

10. The video stream processing method of claim 8, wherein the free blocks nearest to the recorded free blocks are in a same track or a nearest track of the recorded free blocks.

11. A video stream processing method in a broadcast receiving system for time-delayed viewing, which includes a hard disk drive having control information required for recording an input signal and reproducing recorded information recorded in a predetermined area, the video stream processing method comprising:
    using a processor to assign physically discontinuous free blocks in a disk recording area to sequential logical blocks in a circular buffer and recording video streams for time-delayed viewing in the assigned circular buffer blocks, based on the control information when a time-delayed viewing mode is selected;

assigning free blocks of the disk recording area, recording video streams of a channel to be recorded in the assigned physically discontinuous free blocks, assigning free blocks nearest to the recorded free blocks as the circular buffer blocks, and recording video streams for time-delayed viewing in the assigned circular buffer blocks, when a recording mode is selected together with the time-delayed viewing mode; and reading free blocks to be reproduced based on the control information, assigning free blocks nearest to the reproduced free blocks as the circular buffer blocks, and recording the video streams for time-delayed viewing in the assigned circular buffer blocks, when a reproduction mode is selected together with the time-delayed viewing mode, wherein physical blocks are indicated to be free blocks in the control information, and wherein the control information comprises file attribute information, file assignment information, free block information for each track, and circular buffer block information.

12. The video stream processing method of claim 11, wherein the free blocks nearest to the recorded free blocks are in a same track or a nearest track of the recorded free blocks.

13. A video stream processing method in a broadcast receiving system for time-delayed viewing, which includes a hard disk drive having control information required for recording an input signal and reproducing recorded information in a predetermined area, the video stream processing method comprising:

using a processor to assign physically discontinuous free blocks in a disk recording area to sequential logical blocks in a circular buffer and recording video streams for time-delayed viewing in the assigned circular buffer blocks, based on the control information when a time-delayed viewing mode is selected; and reading blocks to be reproduced based on the control information, assigning free blocks nearest to the reproduced free blocks as the circular buffer blocks, and recording the video streams for time-delayed viewing in the assigned circular buffer blocks, when a reproduction mode is selected together with the time-delayed viewing mode, wherein physical blocks are indicated to be free blocks in the control information, and wherein the control information comprises file attribute information, file assignment information, free block information for each track, and circular buffer block information.

14. A video stream processing method in a broadcast receiving system for time-delayed viewing, which includes a hard disk drive having control information required for recording an input signal and reproducing recorded information in a predetermined area, the video stream processing method comprising:

using a processor to assign free blocks of a recording disk area;

recording video streams of a channel to be recorded in the assigned free blocks;

assigning free blocks nearest to the recorded free blocks as logical blocks in a circular buffer; and recording the video streams for time-delayed viewing in the assigned circular buffer blocks, wherein physical blocks are indicated to be free blocks in the control information, and wherein the control information comprises file attribute information, file assignment information, free block information for each track, and circular buffer block information.

15. A video stream processing method in a broadcast receiving system for time-delayed viewing, which includes a hard disk drive having control information required for recording an input signal and reproducing recorded information in a predetermined area, the video stream processing method comprising:

reading blocks to be reproduced based on the control information;

using a processor to assign free blocks nearest to the reproduced free blocks as logical blocks in a circular buffer; and recording video streams for time-delayed viewing in the assigned circular buffer blocks, wherein physical blocks are indicated to be free blocks in the control information, and wherein the control information comprises file attribute information, file assignment information, free block information for each track, and circular buffer block information.

16. A video stream processing method in a broadcast receiving system, the video stream processing method comprising:

recording a video stream in free blocks of a disk recording area or reading a recorded video stream recorded in the disk recording area; and using a processor to assign free blocks nearest to the recorded or reproduced free blocks as logical blocks in a circular buffer, wherein physical blocks are indicated to be free blocks in control information, and wherein the control information comprises file attribute information, file assignment information, free block information for each track, and circular buffer block information.

17. A non-transitory recording medium in a broadcast receiving system having a hard disk drive, the recording medium comprising:

a video stream storing area which records video streams, comprising:
   video stream blocks which are physically discontinuously arranged and assigned sequentially within a circular buffer, and which are used to record video streams for time-delayed viewing; and
   free blocks which are logically assignable to the circular buffer, or which record other video streams during a mode other than a time-delayed viewing mode; and a control information area which stores control information relating to the video stream storing area, wherein the video stream blocks are arranged physically discontinuously based on the control information stored in the control information area, wherein physical blocks are indicated to be free blocks in the control information, and wherein the control information comprises file attribute information, file assignment information, free block information for each track, and circular buffer block information.

18. The recording medium of claim 17, wherein the control information area comprises:

file attribute information;

file assignment information;

free block information which manage the free blocks for each track of the recording medium; and circular block information which manage the circular buffer blocks.

19. A broadcast receiving system, comprising:
a hard disk drive having a hard disk as a recording medium, the recording medium having control information for recording an input signal and reproducing recorded information; and
a controller which assigns physically discontinuous free blocks in a disk recording area to sequential logical blocks in a circular buffer, based upon the control information in response to a time-delayed viewing mode being selected, and which records video streams for time-delayed viewing in the assigned circular buffer blocks,
wherein physical blocks are indicated to be free blocks in the control information, and
wherein the control information comprises file attribute information, file assignment information, free block information for each track, and circular buffer block information.

20. The broadcast receiving system of claim 19, further comprising:
a broadcast signal receiver comprising:
a first radio frequency tuner which receives an external broadcast signal,
a second radio frequency tuner which receives an external analog broadcast signal,
a video compressor which converts the received analog signal to a digital signal and compresses the digital signal, and
a selector which selectively enables transmission of the external digital broadcast signal and the compressed digital signal;
a random access memory which temporarily stores the selectively transmitted external digital broadcast signal and the compressed digital signal from the selector prior to recording on and subsequent to reading from the recording medium; and
a video recovery unit which restores the video streams read from the recording medium and temporarily stored in the random access memory to original signals.

21. The broadcast receiving system of claim 19, further comprising:
an input device which enables simultaneous operation of the time-delayed viewing mode and a recording mode;
wherein the controller assigns free blocks of the recording medium, records the video streams of a channel to be recorded in the assigned free blocks in response to the selection of the simultaneous operation of the time-delayed and recording modes, assigns free blocks nearest to the recorded free blocks as circular buffer blocks, and records the video streams for time-delayed viewing in the assigned circular buffer blocks.

22. The broadcast receiving system of claim 19, further comprising:
an input device which enables simultaneous selection of the time-delayed viewing mode and a reproduction mode;
wherein the controller reads blocks to be reproduced based on the control information, assigns free blocks nearest to the reproduced free blocks as the circular buffer blocks, and records the video streams for time-delayed viewing in the assigned circular buffer blocks, in response to the selection of the simultaneous operation of the time-delayed and reproduction modes.

23. The broadcast receiving system of claim 19, wherein the controller updates the control information and sets a pointer of a write point to a last one of the assigned circular buffer blocks after recording the video streams.

24. The broadcast receiving system of claim 19, wherein the hard disk drive comprises:
a control unit which controls the hard disk drive; and an expander which expands the hard disk drive.

25. The broadcast receiving system of claim 20, wherein the controller comprises:
a read-only memory which stores control program data to control the random access memory and the hard disk drive; and
a second random access memory which temporarily stores data during a control operation of the controller.

26. The broadcast receiving system of claim 19, further comprising:
a random access memory which temporarily stores the video streams prior to recording on and subsequent to reading from the recording medium, wherein the random access memory comprises:
a control information copy area in which the control information is copied during system initialization of the broadcast receiving system,
a circular buffer pointer area having a pointer array which points to the circular buffer blocks, and
a video stream buffer area which buffers blocks of the video streams; and
a video recovery unit which restores the video streams read from the recording medium and temporarily stored in the random access memory to original signals.

27. The broadcast receiving system of claim 26, wherein the circular buffer blocks form a circular buffer and write and read pointers of the circular buffer have specific pointer values in the random access memory so that the circular buffer blocks of the circular buffer are discontinuous.

28. The broadcast receiving system of claim 19, wherein the controller sets a pointer of a write pointer to a last one of the assigned circular buffer blocks and changes the assigned circular buffer blocks to free blocks subsequent to recording the video streams for time-delayed viewing in the assigned circular buffer blocks.

29. The broadcast receiving system of claim 26, wherein the controller sets a pointer of a write pointer to a last one of the assigned circular buffer blocks, changes the assigned circular buffer blocks to free blocks, and updates the control information in the control information copy area of the random access memory, subsequent to recording the video streams for time-delayed viewing in the assigned circular buffer blocks.

30. A broadcast receiving system, comprising:
a hard disk drive having a hard disk as a recording medium, the recording medium having control information for recording an input signal and reproducing recorded information;
a controller which records a video stream in physical free blocks of the recording medium or reads a recorded video stream recorded on the recording medium and assigns physical free blocks nearest to the recorded or reproduced physical free blocks as logical circular buffer blocks based on the control information,
wherein physical blocks are indicated to be free blocks in the control information, and
wherein the control information comprises file attribute information, file assignment information, free block information for each track, and circular buffer block information.

* * * * *